(12) United States Patent
Arrowood et al.

(10) Patent No.: US 6,965,930 B1
(45) Date of Patent: Nov. 15, 2005

(54) METHODS, SYSTEMS AND COMPUTER PROGRAM PRODUCTS FOR WORKLOAD DISTRIBUTION BASED ON END-TO-END QUALITY OF SERVICE

(75) Inventors: Andrew Hilliard Arrowood, Raleigh, NC (US); Wesley McMillian Devine, Apex, NC (US); David Anthony Herr, Apex, NC (US); Lap Thiet Huynh, Raleigh, NC (US); Dinakaran B. Joseph, Durham, NC (US); Alan George Packett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 09/693,663

(22) Filed: Oct. 20, 2000

(51) Int. Cl.[7] .......................................... G06F 15/173
(52) U.S. Cl. ..................... 709/223; 709/224; 709/225; 709/226; 718/105
(58) Field of Search ....................... 709/105, 223–226; 718/105

(56) References Cited

U.S. PATENT DOCUMENTS

| | | | |
|---|---|---|---|
| 4,403,286 A | 9/1983 | Fry et al. | 364/200 |
| 4,495,570 A | 1/1985 | Kitajima et al. | 364/200 |
| 4,577,272 A | 3/1986 | Ballew et al. | 364/200 |

(Continued)

OTHER PUBLICATIONS

A. Dahlin, et al. *EDDIE A Robust and Scalable Internet Server*. Ericsson Telecom AB, Stockholm, Sweden (May 1998).

(Continued)

*Primary Examiner*—Ario Etienne
*Assistant Examiner*—LaShonda Jacobs
(74) *Attorney, Agent, or Firm*—Myers Bigel Sibley & Sajovec

(57) ABSTRACT

Methods, systems and computer program products provide for distributing workload between data processing systems executing an application which communicates over a network, by receiving a request for a connection to the application over the network, obtaining workload information for the data processing systems, obtaining network quality of service (QoS) information associated with communications over the network for the data processing systems and utilizing the workload information and the corresponding network quality of service information for the data processing systems so as to provide workload metrics. The requested connection to the application is distributed based on the generated workload metrics.

18 Claims, 7 Drawing Sheets

U.S. PATENT DOCUMENTS

| | | | |
|---|---|---|---|
| 5,031,089 A | 7/1991 | Liu et al. | 364/200 |
| 5,341,477 A | 8/1994 | Pitkin et al. | 395/200 |
| 5,537,542 A * | 7/1996 | Eilert et al. | 709/201 |
| 5,563,878 A | 10/1996 | Blakeley et al. | 370/60 |
| 5,603,029 A * | 2/1997 | Aman et al. | 718/105 |
| 5,675,739 A | 10/1997 | Eilert et al. | 395/200 |
| 5,740,371 A | 4/1998 | Wallis | 395/200.59 |
| 5,754,752 A | 5/1998 | Sheh et al. | 395/182.02 |
| 5,774,660 A * | 6/1998 | Brendel et al. | 709/201 |
| 5,774,668 A * | 6/1998 | Choquier et al. | 709/223 |
| 5,796,936 A | 8/1998 | Watabe et al. | 395/182.09 |
| 5,812,771 A | 9/1998 | Fee et al. | 395/200.31 |
| 5,828,847 A | 10/1998 | Gehr | 395/200.69 |
| 5,867,636 A | 2/1999 | Walker | 395/114 |
| 5,867,661 A | 2/1999 | Bittinger et al. | 709/227 |
| 5,917,997 A | 6/1999 | Bell et al. | 395/182.02 |
| 5,918,017 A | 6/1999 | Attanasio et al. | 395/200.54 |
| 5,923,854 A | 7/1999 | Bell et al. | 395/200.73 |
| 5,935,215 A | 8/1999 | Bell et al. | 709/239 |
| 5,941,988 A | 8/1999 | Bhagwat et al. | 713/201 |
| 5,946,686 A | 8/1999 | Schmuck et al. | 707/10 |
| 5,951,650 A | 9/1999 | Bell et al. | 709/238 |
| 5,951,694 A | 9/1999 | Choquier et al. | 714/15 |
| 6,031,978 A | 2/2000 | Cotner et al. | 395/200.78 |
| 6,119,174 A * | 9/2000 | Borowsky et al. | 710/15 |
| 6,128,279 A | 10/2000 | O'Neil et al. | 370/229 |
| 6,141,759 A * | 10/2000 | Braddy | 713/201 |
| 6,223,205 B1 * | 4/2001 | Harchol-Balter et al. | 718/105 |
| 6,247,057 B1 | 6/2001 | Barrera, III | 709/229 |
| 6,252,878 B1 | 6/2001 | Locklear, Jr. et al. | 370/401 |
| 6,286,039 B1 | 9/2001 | Van Horne et al. | 709/221 |
| 6,314,463 B1 * | 11/2001 | Abbott et al. | 709/224 |
| 6,317,786 B1 | 11/2001 | Yamane et al. | 709/224 |
| 6,330,560 B1 | 12/2001 | Harrison et al. | 707/8 |
| 6,363,081 B1 | 3/2002 | Gase | 370/466 |
| 6,374,300 B2 | 4/2002 | Masters | 709/202 |
| 6,430,622 B1 | 8/2002 | Aiken, Jr. et al. | 709/245 |
| 6,445,704 B1 | 9/2002 | Howes et al. | 370/392 |
| 6,446,225 B1 | 9/2002 | Robsman et al. | 714/55 |
| 6,542,926 B2 | 4/2003 | Zalewski et al. | 709/213 |
| 6,578,066 B1 | 6/2003 | Logan et al. | 709/105 |
| 6,587,866 B1 | 7/2003 | Modi et al. | 709/105 |
| 6,591,262 B1 | 7/2003 | Maclellan et al. | 707/2 |
| 6,594,268 B1 * | 7/2003 | Aukia et al. | 370/400 |
| 6,606,315 B1 | 8/2003 | Albert et al. | 370/352 |
| 6,650,641 B1 | 11/2003 | Albert et al. | 370/392 |
| 6,657,974 B1 | 12/2003 | Britton et al. | 370/216 |
| 6,701,377 B2 | 3/2004 | Burmann et al. | 709/249 |
| 6,704,317 B1 | 3/2004 | Dobson | 370/401 |
| 6,718,383 B1 | 4/2004 | Hebert | 709/224 |
| 6,748,413 B1 * | 6/2004 | Bournas | 718/105 |
| 6,748,414 B1 * | 6/2004 | Bournas | 718/105 |
| 2002/0010783 A1 | 1/2002 | Primak et al. | 709/228 |
| 2002/0091831 A1 | 7/2002 | Johnson | 709/227 |
| 2002/0124089 A1 | 9/2002 | Aiken, Jr. et al. | 709/227 |
| 2002/0143953 A1 | 10/2002 | Aiken, Jr. et al. | 709/227 |
| 2002/0143954 A1 | 10/2002 | Aiken, Jr. et al. | 709/227 |
| 2002/0166080 A1 | 11/2002 | Attanasio et al. | 714/15 |
| 2002/0178265 A1 | 11/2002 | Aiken, Jr. et al. | 709/227 |
| 2002/0178268 A1 | 11/2002 | Aiken, Jr. et al. | 709/228 |
| 2002/0199000 A1 | 12/2002 | Banerjee | 709/227 |
| 2003/0061402 A1 | 3/2003 | Yadav | 709/328 |
| 2003/0079146 A1 | 4/2003 | Burstein | 713/201 |
| 2003/0202536 A1 | 10/2003 | Foster et al. | 370/469 |

OTHER PUBLICATIONS

Brochure entitled, *ACEdirector™ 8-PORT 10/100 MBPS Ethernet Switch*. Alteon WebSystems, San Jose, CA (1999).
Brochure entitled, *Enhancing Web User Experience with Global Server Load Balancing*. Alteon WebSystems, San Jose, CA (Jun. 1999).
Brochure entitled, *The Next Step in Server Load Balancing*. Alteon WebSystems, San Jose, CA (Nov. 1999).
Mac Devine. Presentation entitled, *TCP/IP Application Availability and Workload Balancing in the Parallel Sysplex*. Share Technical Conference (Aug. 22-27, 1999).
http://w3.enterlib.ibm.com:80/cgi-bin/bookmgr/books/ F1AF7001/1.3.1.2; 1.3.1.2.5 Virtual IP Addressing (VIPA); Excerpt from IP Configuration for OS/390, pp. 1-4 (1998).
http://w3.enterlib.ibm.com:80/cgi-bin/bookmgr/books/ F1AF7001/1.3.2; 1.3.20 DEVICE and LINK Statement—Virtual Devices (VIPA); Excerpt from IP Configuration for OS/390, pp. 1-3 (1998).
http://w3.enterlib.ibm.com:80/cgi-bin/bookmgr/books/ F1AF7001/1.3.2; 1.3.23. HOME Statement; Excerpt from IP Configuration for OS/390, pp. 1-6 (1998).
Pai et al. *Locality-Aware Request Distribution in Cluster-based Network Servers*. Proceedings of the 8th International Conference on Architectural Support for Programming Languages and Operating Systems (ASPLOS VIII), San Jose, CA, Oct., 1998.
Aron et al. "Scalable Content-aware Request Distribution in Cluster-based Network Servers." Proc. of the 2000 Annual Usenix Technical Conference, San Diego, CA, Jun. 2000.
Aron et al. "Efficient Support for P-HTTP in Cluster-Based Web Servers." Proc. of 1999 Annual Usenix Technical Conference, Monterey, CA, Jun. 1999.
Aron, Mohit. "Scalable Content-aware Request Distribution in Cluster-based Network Servers." http://softlib.rice.edu/softlib/scalableRD.html. Department of Computer Science, Rice University.
"Data Communications Awards Allot Communications 'Hot Product' in Internetworking/IP Tools Category." Press Bulletin. Los Gatos, CA, Jan. 18, 1999.
"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.
"Allot Announces the General Availability of its Directory Sevices-Based NetPolicy™ Manager." Press Bulletin. Tel Aviv, Israel, Feb. 28, 2000.
"Allot Communications Announces the Netenforcer Family of IP Traffic Management Products: Fault-Tolerant, Scaleable, Policy-Based Bandwidth Management, QOS, SLA Solutions." Press Bulletin. Burlingame, CA, Dec. 13, 1999.
"Allot Communications Announces Business-Aware Network Policy Manager." Press Bulletin. Sophia Antipolis, France, Sep. 20, 1999.
"Allot Communications Announces Directory Services Based Network Policy Manager." Press Bulletin. Los Gatos, CA, Apr. 5, 1999.
"Allot Communications Launches NetEnforcer with NetWizard, the Fastest Way to Implement Accurate and Reliable Network QoS Policies." Press Bulletin. Burlingame, CA, Jan. 25, 2001.
"Policy-Based Network Architecture." from www.allot.com pp. 1-11.
U.S. Appl. No. 09/640,438, filed Aug. 17, 2000.
U.S. Appl. No. 09/693,027, filed Oct. 20, 2000.
U.S. Appl. No. 09/640,409, filed Aug. 17, 2000.
U.S. Appl. No. 09/640,412, filed Aug. 17, 2000.

* cited by examiner

METHODS, SYSTEMS AND COMPUTER PROGRAM PRODUCTS FOR WORKLOAD DISTRIBUTION BASED ON END-TO-END QUALITY OF SERVICE

RELATED APPLICATIONS

The present application is related to concurrently filed and commonly assigned U.S. patent application Ser. No. 09/693, 027, entitled "METHODS, SYSTEMS AND COMPUTER PROGRAM PRODUCTS FOR POLICY BASED DISTRIBUTION OF WORKLOAD TO SUBSETS OF POTENTIAL SERVERS", the disclosure of which is incorporated herein by reference as if set forth fully herein.

FIELD OF THE INVENTION

The present invention relates to network communications and more particularly to workload distribution within a cluster of data processing systems communicating over a network.

BACKGROUND OF THE INVENTION

Scalability and load balancing in network servers are issues which have received considerable attention in light of the expansion of the Internet. For example, it may be desirable to have multiple servers servicing customers. The workload of such servers may be balanced by providing a single network visible Internet Protocol (IP) address which is mapped to multiple servers.

Such a mapping process may be achieved by, for example, network address translation (NAT) facilities, dispatcher systems and Dynamic Name Server/WorkLoad Management (DNS/WLM) systems from International Business Machines Corporation (IBM), Armonk, N.Y. These various mechanisms for allowing multiple servers to share a single IP address are illustrated in FIGS. 1 through 3. FIG. 1 illustrates a conventional network address translation system as described above. In the system of FIG. 1, a client 10 communicates over a network 12 to a network address translation (NAT) system 14. The network address translation system receives the communications from the client 10 and converts the communications from the addressing scheme of the network 12 to the addressing scheme of the network 12' and sends the messages to the servers 16. A server 16 may be selected from multiple servers 16 at connect time and may be on any host, one or more hops away. All inbound and outbound traffic flows through the NAT system 14.

FIG. 2 illustrates a conventional DNS/WLM system as described above. The server 16 is selected at name resolution time when the client 10 resolves the name for the destination server from the DNS/WLM system 17 which is connected to the servers 16 through the coupling facility (CF) 19. The DNS/WLM system 17 of FIG. 2 relies on the client 10 adhering to a "zero time to live" lifetime for IP addresses such that IP addresses are not cached by the client.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node 18 can also issue "null" queries to selected application server instances as a means of determining server instance health.

In addition to the above described systems, Cisco Systems offers a Multi-Node Load Balancing function on certain of its routers that performs the distribution function. Such operations appear similar to those of the IBM 2216.

Finally, in addition to the system described above, AceDirector from Alteon provides a virtual IP address and performs network address translation to a real address of a selected server application. AceDirector appears to observe connection request turnaround times and rejection as a mechanism for determining server load capabilities.

SUMMARY OF THE INVENTION

Methods, systems and computer program products according to embodiments of the present invention provide for distributing workload between data processing systems executing an application which communicates over a network, by receiving a request for a connection to the application over the network, obtaining workload information for the data processing systems, obtaining network quality of service (QoS) information associated with communications over the network for the data processing systems and utilizing the workload information and the corresponding network quality of service information for the data processing systems so as to provide workload metrics. The requested connection to the application is distributed based on the generated workload metrics.

In particular embodiments of the present invention, the network quality of service information is network packet loss information, network timeout information, and/or number of connections information. Furthermore, the workload information may be a weight value (W) corresponding to a data processing system's processing capacity.

In further embodiments of the present invention, the network quality of service information is a loss weight (F-loss) based on packet loss ratio, a network timeout weight (F-timeout) based on a network timeout ratio and/or a connection weight (F-con) based on a number of active connections. In such embodiments, F-loss may be a ratio of retransmitted packets to total transmitted packets. F-timeout may be a ratio of number of timeouts to number of transmitted segments, and F-con may be a ratio of current connections to total allowed connections. Alternatively, a value for F-loss may be determined by mapping a TCP loss ratio to the value for F-loss. A value for F-timeout may be determined by mapping a timeout loss ratio to the value for F-timeout. A value for F-conn may be assigned by determining if a number of current connections exceeds a predefined percentage of a total number of allowed connections and setting F-con to 1 if the total number of connections exceeds the predefined percentage of the total number of allowed connections and to 0 if it does not.

In still further embodiments of the present invention, the workload information is combined with the corresponding network quality of service information by evaluating the equation:

$$Aw=(1-MIN(1, F\text{-loss}+F\text{-timeout}+F\text{-con}))*W$$

where Aw is the generated workload metric and W is the workload weight.

In particular embodiments, the quality of service information comprises quality of service information for the application. The quality of service information may also be divided into classes of quality of service information associated with the application based on a common constraint. In such embodiments, a class of quality of service information associated with the connection request may be determined and network quality of service information for the class of quality of service information associated with the connection request is obtained for use in determining the combined workload metric. Thus, the workload information and the corresponding network quality of service information for the data processing systems based on the class of quality of service information associated with the request may be combined to provide a generated workload metric which takes into account the workload information, the quality of service information and the class of quality of service information associated with the request.

In yet other embodiments of the present invention, the data processing systems are data processing systems in a Sysplex. In such Sysplex embodiments, the receipt of the request for a connection to the application over the network, the obtaining of workload information for the data processing systems and network quality of service information associated with communications over the network for the data processing systems, the combining of the workload information and the corresponding network quality of service information and the distribution of the requested connection to the data processing systems may be carried out by a routing communication protocol stack in the Sysplex. Furthermore, the routing communication protocol stack may obtain the quality of service information from policy agents executing on the data processing systems in the Sysplex.

In still additional embodiments of the present invention, a system for workload distribution is provided which includes a workload distributer which selects data processing systems in a cluster of data processing systems for distribution of connections based on quality of service information associated with the data processing systems and workload information associated with the data processing systems. A router, operably associated with the workload distribution function, receives requests for connections to instances of applications executing on the data processing systems and distributes the connections to data processing systems in the cluster of data processing systems. The router may be a routing communication protocol stack. Furthermore, the requests for connections to the applications may be requests for connections to a dynamically routable virtual Internet Protocol address. Additionally, the system may further include policy agents associated with the data processing systems which provide quality of service information to the workload distributer.

In particular embodiments, the network quality of service information may be a loss weight (F-loss) based on packet loss ratio, a network timeout weight (F-timeout) based on a network timeout ratio and a connection weight (F-con) based on a number of active connections. In such embodiments, the workload distributer may be configured to evaluate the equation:

$$Aw=(1-MIN(1, F\text{-loss}+F\text{-timeout}+F\text{-con}))*W$$

where W is the workload information and select a data processing system with a highest Aw value. Furthermore, F-loss may be determined by mapping a TCP loss ratio to the value for F-loss, F-timeout may be determined by mapping a timeout loss ratio to the value for F-timeout and F-conn may have a value of 1 if a total number of connections to an application associated with a connection request exceeds a predefined percentage of the total number of allowed connections and to 0 if the total number of connections does not exceed the predefined percentage of the total number of allowed connections.

As will further be appreciated by those of skill in the art, the present invention may be embodied as methods, apparatus/systems and/or computer program products.

DETAILED DESCRIPTION OF THE INVENTION

Figure 1:
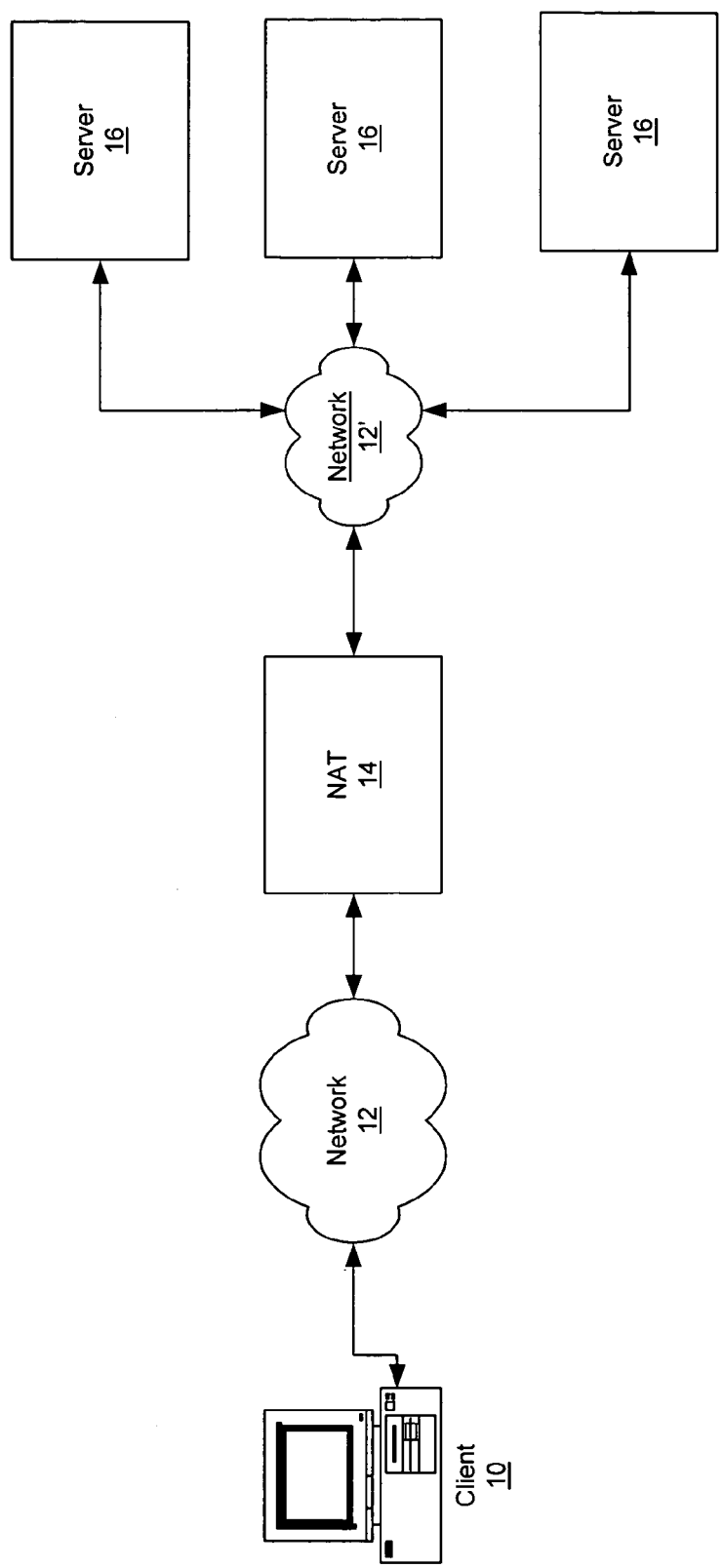
FIG. 1 is block diagram of a conventional network address translation system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code embodied in the medium for use by or in connection with an instruction execution system. In the context of this document, a computer-usable or computer-readable medium can be any structure that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for workload distribution between a plurality of communication protocol stacks in a cluster of data processing systems based on processing ability and end-to-end quality of service ("QoS") performance for a target data processing system. While embodiments of the present invention may be incorporated into any routing based workload distribution system, in particular embodiments of the present invention, workload is distributed by routing protocol stacks which associate a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs" (DVIPA). Workload distribution may be accomplished in such routing communication protocol stacks during the selection process when a connection using the DVIPA is established.

Particular preferred systems in which embodiments of the present invention may be utilized are described in commonly assigned U.S. patent application Ser. No. 09/640,412, entitled, "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS", U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES" all filed Aug. 17, 2000, and U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosures of which are each incorporated herein by reference as if set forth fully herein.

Figure 2:
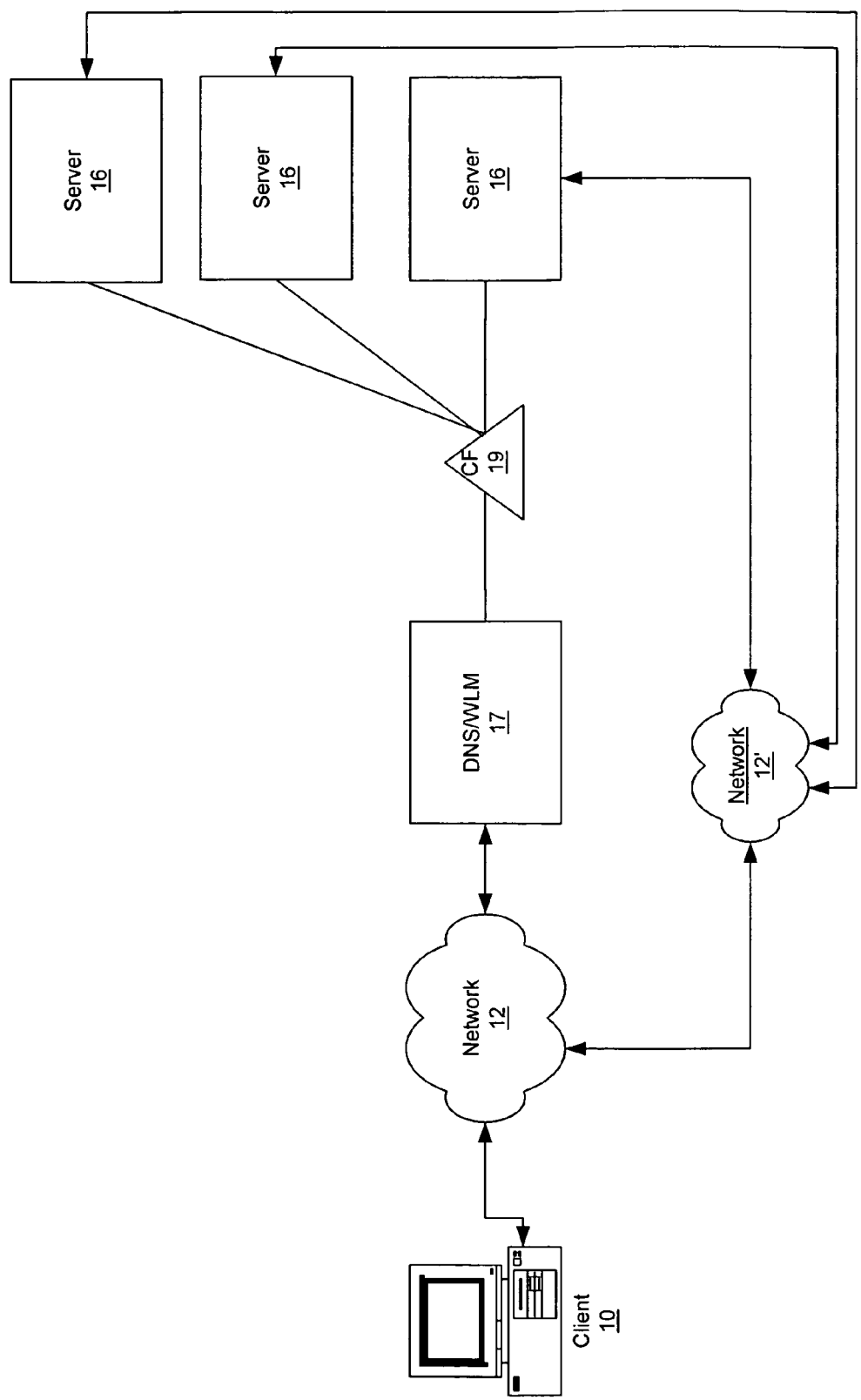
FIG. 2 is block diagram of a conventional DNS/WLM system.
Figure 3:
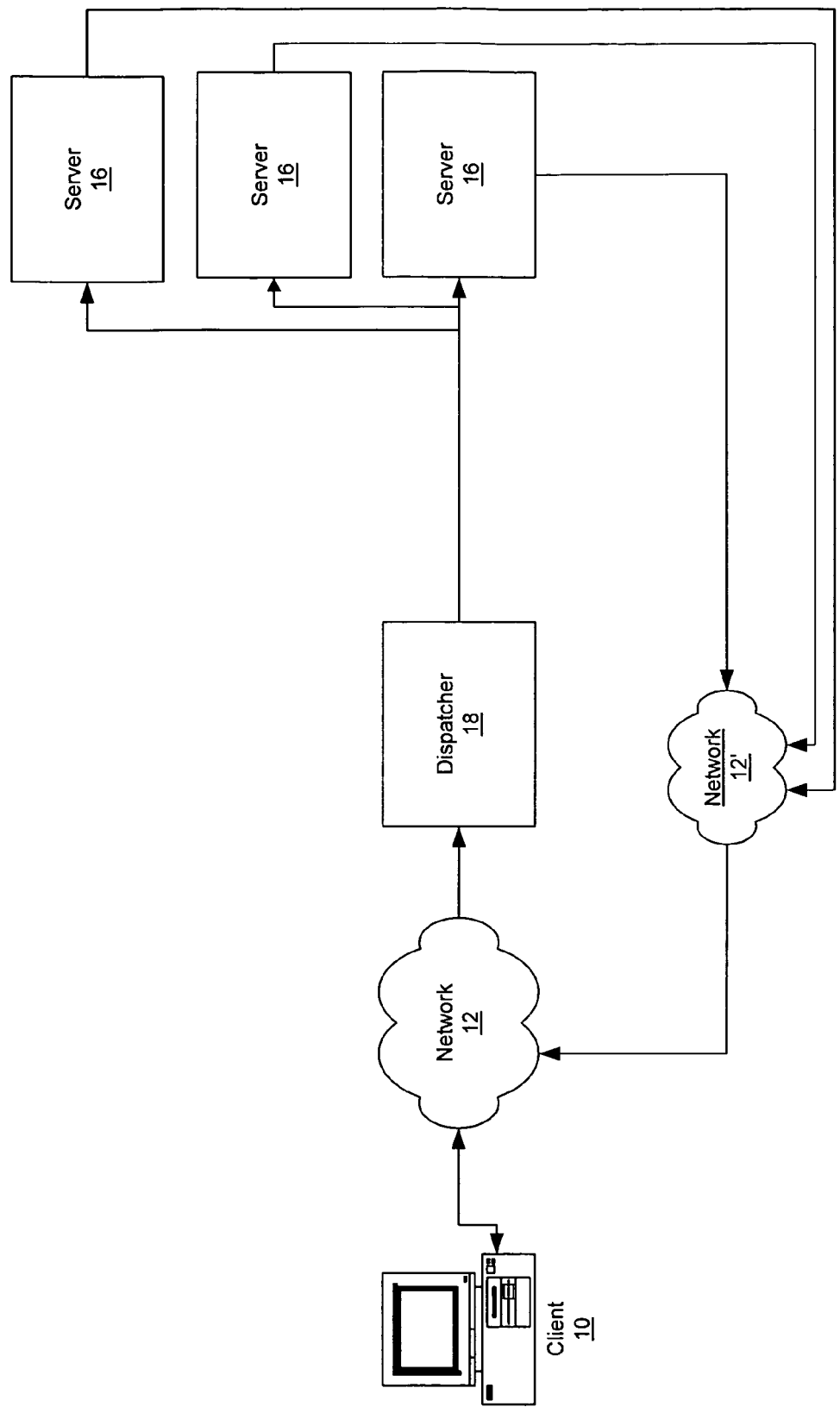
FIG. 3 is block diagram of a conventional dispatcher system.

While the present invention is described with reference to a specific embodiment in a System/390 Sysplex, as will be appreciated by those of skill in the art, the present invention may be utilized in other systems where clusters of computers utilize virtual addresses by associating an application or application group, rather than a particular communications adapter, with the addresses. For example, the present invention may be incorporated into the network address translation function 14 of FIG. 1, the DNS/WLM function 17 of FIG. 2 or the dispatcher function 18 of FIG. 3 by providing such functions with workload and QoS information as described herein. Thus, the present invention should not be construed as limited to the particular exemplary embodiments described herein.

Figure 4:
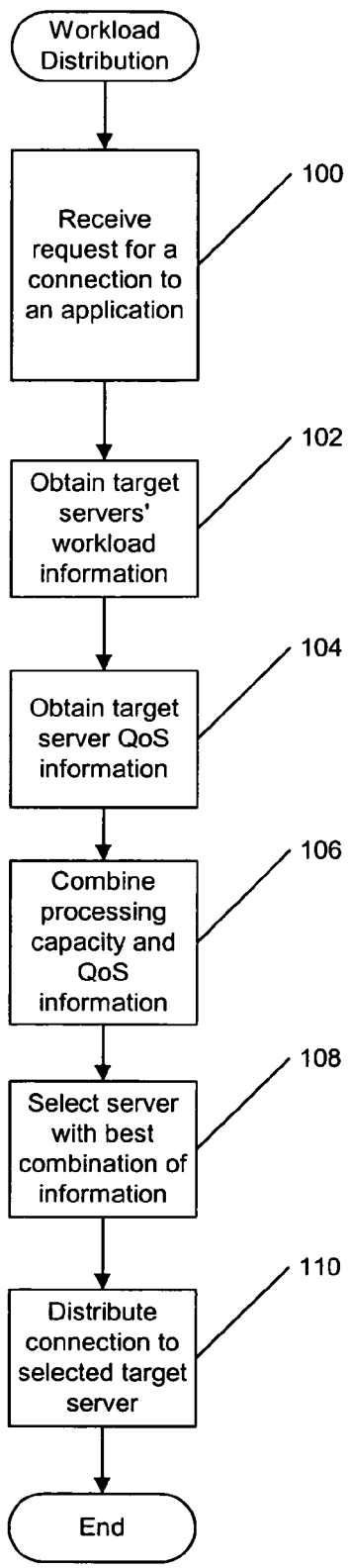
FIG. 4 is a flowchart illustrating operations according to embodiments of the present invention.

Operations according to embodiments of the present invention will now be generally described with reference to FIG. 4. As seen in FIG. 4, a request for a connection to an application executing on data processing systems in a cluster of data processing systems is received (block 100). Workload information, such as an indication of the processing capacity utilization of the servers in the cluster of data processing servers, is obtained (block 102) as well as QoS information for the servers (block 104). The QoS information may be obtained on a server basis or for connections having constraints in common with the requested connection (e.g. a common QoS level). The processing capacity utilization information and the QoS information are utilized (block 106) to provide a workload metric which may be utilized in selecting a target server for the connection. The server having the best or a sufficiently satisfactory workload metric is selected (block 108) and the connection request is distributed to the selected server (block 110).

The QoS information utilized in the workload distribution preferably includes QoS information such as packet loss information, timeout information and/or connection usage information. Other suitable QoS measurements may also be utilized. The QoS measurements may be ratios, such as a packet loss ratio, a timeout ratio, or a connection utilization ratio, which may be used directly or may be weighted. Workload information may, for example, be provided as a workload weight (W) which expresses the utilization of capacity for a target server as a range of values. For example, the IBM WorkLoad Manager (WLM) provides an integer value from 0 to 64 with 64 being the highest availability capacity. Such workload values may represent the capacity of the server, the application, other critical resources of the server or combinations thereof. Furthermore, while the combination of QoS information and processor capacity utilization information is described above as being performed as a separate operation, as will be appreciated by those of skill in the art, such operations need not produce an intermediate result but may be combined in a single operation.

Figure 5:
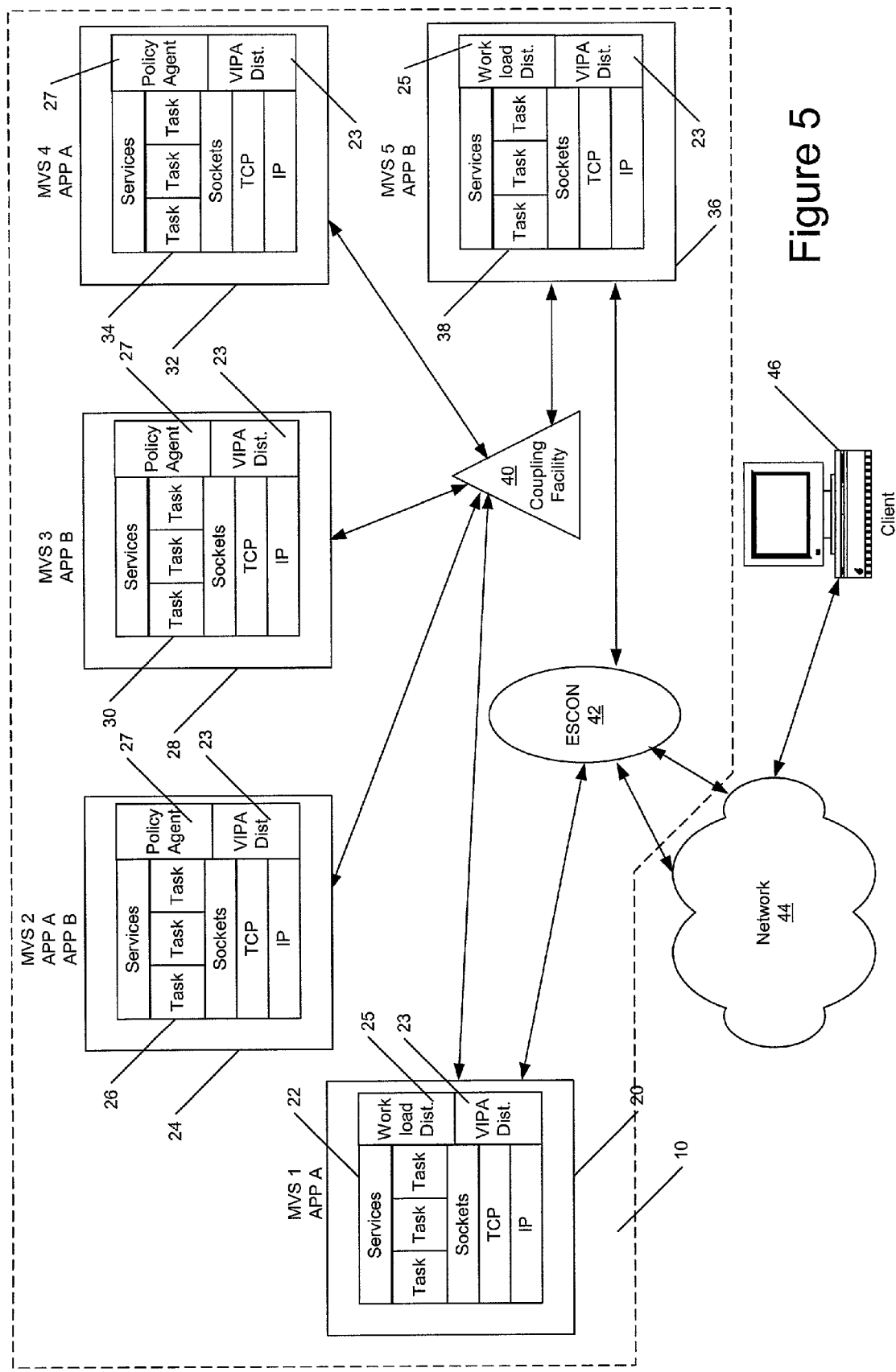
FIG. 5 is block diagram of a cluster of data processing systems incorporating embodiments of the present invention.

Particular embodiments of the present invention will now be described with reference to FIGS. 5 through 7 which illustrate embodiments of the present invention in a Sysplex cluster. A cluster of data processing systems is illustrated in FIG. 5 as cluster nodes in the Sysplex 10. As seen in FIG. 5, several data processing systems 20, 24, 28, 32 and 36 are interconnected in a Sysplex 10. The data processing systems 20, 24, 28, 32 and 36 illustrated in FIG. 5 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting workload distribution based on workload and end-to-end connection QoS information as described herein.

As is further illustrated in FIG. 5, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 incorporate a VIPA distribution function 23 as described in the above reference United States Patent Applications. Furthermore, the communication protocol stacks 22 and 38 function as routing communication protocol stacks and, therefore, also incorporate a workload distribution function 25 which may function as a workload distributer and which may work in cooperation with the VIPA distribution function 23 so as to distribute DVIPA connections among target communication protocol stacks based on resource availability and end-to-end QoS information. The communication protocol stacks 26, 30 34 function as server communication protocol stacks and, therefore, include a policy agent 27 which provides QoS information to the workload distribution function 25. If a communication protocol stack functions as both a server stack and a routing stack, then the workload distribution function 25 may perform the functions of the policy agent 27 or a policy agent 27 may also be provided on these stacks.

While each of the communication protocol stacks 22, 26, 30, 34 and 38 illustrated in FIG. 5 incorporate the VIPA distribution function 23 and either a workload distribution function 25 or a policy agent 27, not all communication protocol stacks in a Sysplex need incorporate these functions. Thus, the present invention may be carried out on any system where two or more communication protocol stacks in a cluster of data processing systems support workload distribution and dynamic routable VIPAs. If a communication protocol stack does not support workload distribution and dynamic routable VIPAs, then the workload distribution and dynamic routable VIPA messages according to the present invention could be ignored by the communication protocol stack. Thus, the present invention may provide backward compatibility with existing communication protocol stacks.

As is further seen in FIG. 5, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize network 44 to communicate with an application executing on an MVS image in Sysplex 10 through the communication protocol stacks 22 and 38 which may function as routing protocol stacks as described herein.

As an example of utilization of the present invention, for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications.

Thus, the communication protocol stacks 22, 26 and 34 may function as server communication protocol stacks for the application APP A. Likewise, the communication protocol stacks 26, 30 and 38 may function as server communication protocol stacks for the application APP B. As is illustrated in FIG. 5, a communication protocol stack may be both a routing communication protocol stack and a server communication protocol stack.

Utilizing the above described system configuration as an example, the workload distribution function 25 utilizing the VIPA distribution function 23 will now be described. The VIPA distribution function 23 allows for protocol stacks which are defined as supporting DVIPAs to share the DVIPA and communicate with the network 44 through a routing protocol stack such that all protocol stacks having a server application which is associated with the DVIPA may appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA is started. Because communications to the DVIPA are routed through the routing protocol stack, the routing protocol stack may provide work load balancing through the workload distribution function 25 by distributing connections to the other protocol stacks on MVS images executing server applications which bind to the DVIPA to balance workload. The VIPA distribution function 23 allows automated movement of a routing protocol function to a backup stack and allows recovery of a failed routing stack without disruption to connections through the backup stack. In such cases, the workload distribution function 25 would also be moved or recovered on the backup stack.

For the present example, application APP A is associated with DVIPA VA1 which may be associated with the respective first, second and third instances of APP A. Application APP B, likewise, has DVIPA VB1 associated with the respective first, second and third instances of APP B.

Returning to the example illustrated in FIG. 5, the communication protocol stacks 22, 26, 30, 34 and 38 may be configured as to which stacks are routing stacks, backup routing stacks and server stacks as described in the above referenced United States Patent Applications. The workload distribution functions 25 for routing communication protocol stacks may perform the operations illustrated in FIG. 6. The workload distribution function 25 or policy agent 27 in server stacks may perform the operations illustrated in FIG. 7.

Figure 6:
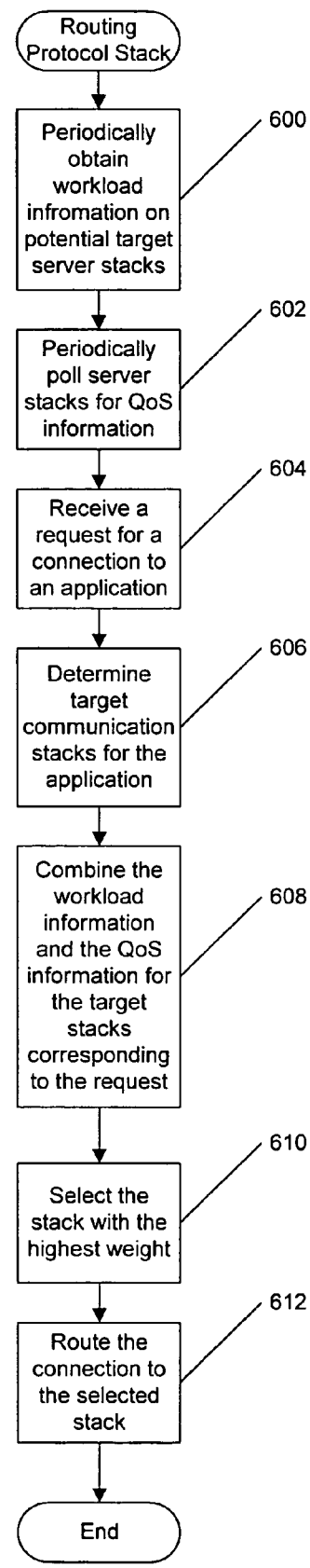
FIG. 6 is a flowchart illustrating operations of a routing protocol stack according to embodiments of the present invention.
Figure 7:
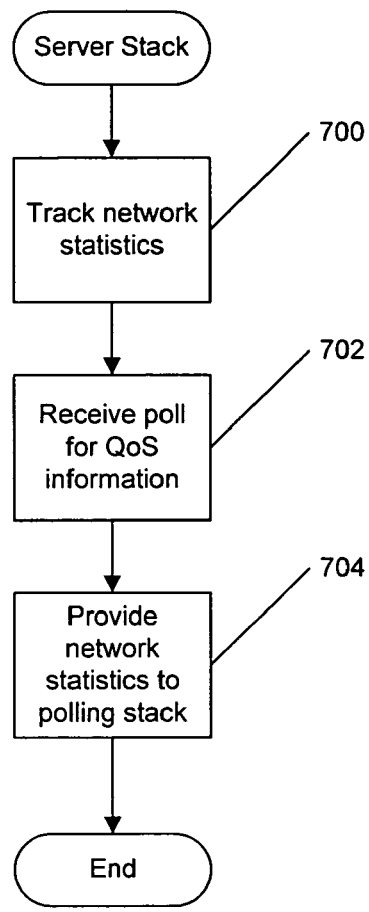
FIG. 7 is a flowchart illustrating operations of a server protocol stack according to embodiments of the present invention.

As seen in FIG. 6, the workload distribution function 25 of routing communication protocol stacks, such as the communication protocol stacks 22 and 38, periodically obtains workload information from OS/390 WLM utilizing conventional Sysplex communication techniques (block 600). This information may take the form of a workload weight (W) associated with each server communication protocol stack for which the communication protocol stacks 22 and 38 function as routing communication protocol stacks. The weight may, for example, be a value between 0 and 64 with 64 representing the highest available processing capacity. The workload distribution function 25 of the routing communication protocol stacks 22 and 38 also periodically poll the other communication protocol stacks to obtain QoS information from the server communication protocol stacks (block 602). Such a poll may be individually addressed to the server communication protocol stacks or may be broadcast. Polling may utilize XCF messaging and the coupling facility 40 for communication between the communication protocol stacks. The QoS information may be provided by the policy agents 27 of the server communication protocol stacks or by the workload distribution function 25 if the stack is both a server stack and a routing stack. Furthermore, if the stack is both a server stack and a routing stack, the polling of itself may not involve external communications.

The workload information and the QoS information may be obtained for only communication protocol stacks for which a communication protocol stack functions as a routing communication protocol stack or for all communication protocol stacks in the Sysplex. A communication protocol stack knows if it is a routing communication protocol stack as a result of the DVIPA initialization described in commonly assigned U.S. patent application Ser. No. 09/640,412, entitled, "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS", U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES" all filed Aug. 17, 2000, and U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosures of which are each incorporated herein by reference as if set forth fully herein.

For example, the communication protocol stacks 22 and 38, which are designated as routing protocol stacks as they have connections to the network 44 and include VIPADIStribute statements in the VIPADynamic block, publish the distribution information through messages broadcast by the VIPA distribute function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to all partner communication protocol stacks the complete list of dynamic routable VIPAS, their associated ipAddrList and portlist and the primary and backup definitions for the communication protocol stack. When a communication protocol stack 22, 26, 30, 34 and 38 receives the DVIPA information it notes if it is identified as a candidate target protocol stack or as a backup stack. If the protocol stack is a candidate target stack, the protocol stack monitors applications associated with the protocol stack and sends a message to the defined routing stack when an application instance is bound to the DVIPA and listens on a defined port. Thus, each routing communication protocol stack is aware of each communication protocol stack for which it routes DVIPAs.

Returning to FIG. 6, when a routing communication protocol stack receives a request for a connection to an application (block 604), the routing communication protocol stack determines the potential target communication protocol stacks for the connection (block 606) and determines a workload metric for the potential target communication protocol stacks (block 608). Thus, in the present example, when a connection request is made to DVIPA VA1 to connect to APP A, the communication protocol stack 22 obtains the workload information W and QoS information for MVS1, MVS2 and MVS4. Similarly, when a connection request is made to DVIPA VB1 to connect to APP B, the communication protocol stack 38 obtains the workload information W and QoS information for MVS2, MVS3 MVS5. This information is used to determine the workload metrics for the candidate target protocol stacks. The workload metric may, for example, combine the QoS information and the workload information and be used to select the stack with the best relative performance (e.g., highest weight) (block 610). The requested connection is routed to the selected stack (block 612).

The combination of the QoS information and the workload information may take the form of a determination of the workload metric Aw, which may be referred to as the actual weight used by workload distribution function 25 to select a target communication protocol stack in routing the incoming connection requests for a given application in a target node. Aw is computed as follows:

$$Aw = (1 - MIN(1, F\text{-loss} + F\text{-timeout} + F\text{-con})) * W$$

Aw represents the effective server's capacity to process incoming requests for a given application on a target server node.

In the above equation, W is the Work Load Manager's (WLM) weight for a target server's current processing capacity (such a weight may be per node or per application). The weight W is an integer between 0 and 64, with 64 being the highest, i.e., the most processing capacity for a server. F-loss represents the weight fraction that is derived from the TCP loss ratio (total retransmitted bytes over total transmitted bytes) at the target server node for a given application (e.g., HTTPD, FTPD etc.). F-loss is derived based on statistics collected from a set of active TCP connections to a given application or having a common QOS policy. This fraction is 0<=F-loss <=1.0. F-timeout represents the weight fraction that is derived from the TCP time-outs ratio (number of time outs over number of segments transmitted) at the target server node for a given application. Thus, there is a relationship between F-loss and F-timeout with respect to TCP, but they both may be provided for flexibility. F-timeout may be expressed as 0<=F-timeout <=1.0. F-con represents the weight fraction that is derived based on the current number of active TCP connections compared with the total number of connections allowed for a given application. This value may be a fraction or may be set to either 0 or 1 based on the percentage of connections utilized. For example, when active connections reach 90' of the total connections allowed (e.g., constrained state), F-con is set to 1 and otherwise set to 0. As described above, F-loss, F-timeout, and F-con may be sent to the workload distribution function 25 periodically by the policy agents 27 associated with the server stacks (e.g., Policy Agent, Pagent, manages QoS policies for different applications in a TCP/IP stack).

Furthermore, users may specify a function to map a given TCP loss ratio to a corresponding F-loss. For instance, a 1% loss ratio can be mapped to an F-loss of 0.2, and a 2% loss ratio can be mapped to an F-loss of 0.4 and so on. The same is also true for F-timeout. F-con may be based on Communication Services (CS) for the OS/390 implementation of Traffic Regulation Management (TRM) for its derivation.

The mapping from statistical values to the values of F-loss, F-timeout and F-con may be determined based on policies specified by users based on the importance of such parameters in assuring quality of service to clients requesting connections to an application. If packet loss results in greater disruption to client communications for a particular application, then the function mapping the loss ratio to F-loss may more heavily weight the F-loss value. Similar adjustments may be made to other QoS parameters which may be factored into the combined weight Aw. Such mappings may be carried out by the policy agents 27 or by the workload distribution function 25. Furthermore, the mapping may differ from server to server.

As is seen from the above exemplary equation for Aw, the QoS information may be utilized as a multiplier to further weight the WLM weight W. Thus, for example, if F-con is set to 1 because 90' of the connections for an application are utilized, then the resulting weight Aw will be 0 so that the server is not selected unless all other servers have reached 90% capacity. Otherwise, as seen from the above equation for Aw, the weight W is multiplied by a weighting factor based on the QoS ratios so as to factor the QoS of the network traffic into the total weight. Thus, a server with low processing capacity and a low TCP loss ratio and/or timeout ratio may be selected over a server with high processing capacity but a high loss ratio and/or timeout ratio.

Operations of server stacks will now be further described with reference to FIG. 7. As seen in FIG. 7, the policy agents 27, and, possibly, the workload distribution functions 25 (for protocol stacks having both routing and server functions), track network statistics, such as TCP loss, timeouts and/or total connections (block 700). As described above, this QoS information may be maintained as statistical data or as mapped data to provide QoS weights. When the server stack receives a poll for the QoS information (block 702), the QoS information is provided to the polling stack (block 704). Thus, the QoS information may be communicated to a routing stack so that the routing stack may use the information in determining workload distribution.

While the embodiments above have been described with reference to particular mechanisms for determining F-loss and F-timeout based on statistics collected for a given application at a target node, such determination of QoS information can also be based on a set of TCP connections that have a common constraint (e.g., mapped to the same QoS policy) within an application. Such a division of QoS information based on common constraints may be beneficial if different clients accessing the same application have different QoS requirements. The Aw weight computed by the workload distribution function 25 may be used for routing incoming requests that fall into the same common constraint category (a common class of requests). Furthermore, different weighting functions may be used for different classes of incoming requests. For example, if a request has high quality of service requirements, then the QoS information may be weighted more heavily in the determination of Aw then for classes of connections with lower QoS requirements.

Embodiments of the present invention have been described with reference to FIGS. 4 through 7 which are block diagrams and flowchart illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instructions for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

While the present invention has been described with respect to the workload distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environment, by associating applications or groups of applications with an address rather than a communications adapter. Thus, the present invention may be suitable for use in any collection of data processing systems which allow sufficient communication to all systems for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of distributing workload between data processing systems executing an application which communicates over a network, the method comprising:

receiving a request for a connection to the application over the network;

obtaining workload information for the data processing systems;

obtaining network quality of service information associated with communications over the network for respective ones of the data processing systems;

generating workload metrics associated with respective ones of the data processing systems utilizing the workload information and the corresponding network quality of service information for the data processing systems;

distributing the requested connection to instances of the application executing on the data processing systems based on the generated workload metrics;

wherein the workload information comprises a weight value (W) corresponding to a data processing systems processing capacity;

wherein the network quality of service information comprises a loss weight (F-loss) based on packet loss ratio, a network timeout weight (F-timeout) based on a network timeout ratio and a connection weight (F-con) based on a number of active connections;

determining a value for F-loss by mapping a TCP loss ratio to the value for F-loss;

determining a value for F-timeout by mapping a timeout loss ratio to the value for F-timeout;

determining a value for F-conn by determining if a number of current connections exceed a predefined percentage of a total number of allowed connections and setting F-con to 1 if the total number of connections exceeds the predefined percentage of the total number of allowed connections of the total number of allowed connections; and wherein generating workload metrics comprises evaluating the equation:

$$Aw = (1 - \text{MIN}(1, F\text{-loss} + \text{timeout} + F\text{-con}) * W$$

where Aw is the workload metric.

2. A method according to claim 1, wherein the quality of service information comprises quality of service information for an instance of the application executing on one of the data processing systems.

3. A method according to claim 1, wherein the quality of service information is divided into classed of quality of service information associated with the application based on a common constraint, the method further comprising the step of:

determining a class of quality of service information associated with the connection request; and wherein the step of obtaining network quality of service information associated with communications over the network for the data processing systems comprises obtaining network quality of service information for the class of quality of service information associated with the connection request.

4. A method according to claim 3, wherein the step of generating workload metrics comprises the step of combining the workload information and the corresponding network quality of service information for the data processing systems based on the class of quality of service information associated with the request so as to provide workload metrics based on the workload information, the quality of service information and the class of quality of service information associated with the request.

5. A method according to claim 1, wherein the data processing systems comprise data processing systems in a Sysplex, wherein the steps of receiving a request for a connection to the application over the network, obtaining workload information for the data processing systems, obtaining network quality of service information associated with communications over the network for the data processing systems, generating workload metrics and distributing the requested connection to application instances on the data processing systems based on the workload metric are carried out by a routing communication protocol stack in the Sysplex.

6. A method according to claim 5 wherein the routing communication protocol stack obtains the quality of service information from policy agents executing on the data processing systems iii the Sysplex.

7. A system for workload distribution, comprising:

a workload distributer which selects data processing systems in a cluster of data processing systems for distribution of connections based on network quality of service information associated with the data processing systems and workload information associated with the data processing systems;

a router operably associated with the workload distributer which receives requests for connection to an application executing on ones of the data processing systems and distributes the connections to data processing systems in the cluster of data processing systems selected by the workload distributer;

wherein the network quality of service information comprises a loss weight (F-loss) based on packet loss ratio, a network timeout weight (F-timeout) based on a network timeout ratio and a connection weight (F-con) based on a number of active connections:

wherein F-loss is determined by mapping a TCP loss ratio to the value for F-loss, F-timeout is determined by mapping a timeout loss ratio to the value for F-timeout and F-conn has a value of 1 if a total number of connections to the application associated with the connection request exceeds a predefined percentage of the total number of allowed connections and 0 if the total number of connections does not exceed the predefined percentage of the total number of allowed connections;

wherein the workload distributer is configured to evaluate the equation:

$$Aw = (1 - \text{MIN}(1, F\text{-loss} + F\text{-timeout} + F\text{-con}) * W$$

where Aw is a workload metric and W is the workload information; and wherein the workload distributor selects a data processing system with a best Aw value.

8. A system according to claim 7, wherein the router comprises a routing communication protocol stack.

9. A system according to claim 8, wherein the requests for connections to the application comprise requests for connections to a dynamically routable virtual Internet Protocol address.

10. A system according to claim 7, further comprising policy agents associated with the data processing systems which provide quality of service information to the workload distributer.

11. A system for distributing workload between data processing systems executing an application which communicates over a network, comprising:

means for receiving a request for a connection to the application over the network;

means for obtaining workload information for the data processing systems;

means for obtaining network quality of service information associated with communications over the network for respective ones of the data processing systems;

means for generating workload metrics associated with respective ones of the data processing systems utilizing the workload information and the corresponding network quality of service information for the data processing systems;

means for distributing the requested connection to instances of the application executing on the data processing systems based on the generated workload metrics;

wherein the workload information comprises a weight value (W) corresponding to a data processing systems processing capacity;

wherein the network quality of service information comprises a loss weight (F-loss) based on packet loss ratio, a network timeout weight (F-timeout) based on a network timeout ratio and a connection weight (F-con) based on a number of active connections;

means for determining a value for F-loss by mapping a TCP loss ratio to the value for F-loss;

means for determining a value for F-timeout by mapping a timeout loss ratio to the value for F-timeout;

means for determining a value for F-conn by determining if a number of current connections exceed a predefined percentage of a total number of allowed connections and setting F-con to 1 if the total number of connections exceeds the predefined percentage of the total number of allowed connections and to 0 if the total number of connections does not exceed the predefined percentage of the total number of allowed connections; and wherein the means for generating workload metrics comprises means for evaluating the equation:

$$Aw=(1-\text{MIN}(1,F\text{-loss}+F\text{-timeout}+F\text{-con})*W$$

where Aw is the workload metric.

12. A system according to claim 11, wherein the quality of service information comprises quality of service information for an instance of the application executing on one of the data processing systems.

13. A system according to claim 11, wherein the quality of service information is divided into classes of quality of service information associated with the application based on a common constraint, further comprising:

means for determining a class of quality of service information associated with the connection request; and wherein the means for obtaining network quality of service information associated with communications over the network for the data processing systems comprises means for obtaining network quality of service information for the class of quality of service information associated with the connection request.

14. A system according to claim 13, wherein the means for generating workload metrics comprises means for combining the workload information and the corresponding network quality of service information for the data processing systems based on the class of quality of service information associated with the request so as to provide workload metrics based on the workload information, the quality of service information and the class of quality of service information associated with the request.

15. A computer program product for distributing workload between data processing systems executing an application which communicates over a network, comprising:

a computer readable storage medium having computer readable program code embodied therein, the computer readable program code comprising:

computer readable program code which receives a request for a connection to the application over the network;

computer readable program code which obtains workload information for the data processing systems;

computer readable program code which obtains network quality of service information associated with communications over the network for respective ones of the data processing systems;

computer readable program code which generates workload metrics associated with respective ones of the data processing systems utilizing the workload information and the corresponding network quality of service information for the data processing systems;

computer readable program code which distributes the requested connection to instances of the application executing on the data processing systems based on the generated workload metrics;

wherein the workload information comprises a weight value (W) corresponding to a data processing systems processing capacity;

wherein the network quality of service information comprises a loss weight (F-loss) based on packet loss ratio, a network timeout weight (F-timeout) based on a network timeout ratio and a connection weight (F-con) based on a number of active connections;

computer readable program code which determines a value for F-loss by mapping a TCP loss ratio to the value for F-loss;

computer readable program code which determines a value for F-timeout by mapping a timeout loss ratio to the value for F-timeout; and computer readable program code which determines a value for F-conn by determining if a number of current connections exceed a predefined percentage of a total number of allowed connections and setting F-con to 1 if the total number of connections exceeds the predefined percentage of the total number of allowed connections and to 0 if the total number of connections does not exceed the predefined percentage of the total number of allowed connections; and wherein the computer readable program code which generates workload metrics comprises computer readable program code which evaluates the equation:

$$Aw=(1-\text{MIN}(1, F\text{-loss}+F\text{-timeout}+F\text{-con}))*W$$

where Aw is the workload metric.

16. A computer program product according to claim 15, wherein the quality of service information comprises quality of service information for an instance of the application executing on one of the data processing systems.

17. A computer program product according to claim 15, wherein the quality of service information is divided into classes of quality of service information associated with the application based on a common constraint, further comprising:

computer readable program code which determines a class of quality of service information associated with the connection request; and wherein the computer readable program code which obtains network quality of service information associated with communications over the network for the data processing systems comprises computer readable program code which obtains network quality of service information for the class of quality of service information associated with the connection request.

18. A computer program product according to claim 17, wherein the computer readable program code which generates workload metrics comprises computer readable program code which combines the workload information and the corresponding network quality of service information for the data processing systems based on the class of quality of service information associated with the request so as to provide workload metrics based on the workload information, the quality of service information and the class of quality of service information associated with the request.

* * * * *

UNITED STATES PATENT AND TRADEMARK OFFICE
CERTIFICATE OF CORRECTION

PATENT NO. : 6,965,930 B1
APPLICATION NO. : 09/693663
DATED : November 15, 2005
INVENTOR(S) : Arrowood et al.

It is certified that error appears in the above-identified patent and that said Letters Patent is hereby corrected as shown below:

On the Title Page,
Item 56, FOREIGN PATENT DOCUMENTS, should include
-- EP   EP0648038A2   8/1994   H04L   29/06 --

Column 13,
Line 31 should read -- of allowed connections and to 0 if the total number of connections does not exceed the predefined percentage of the total number of allowed --

Line 43 should read -- service information is divided into classes of quality of --

Column 14,
Line 12 should read -- cessing systems in the Sysplex. --

Line 37 should read -- total number of allowed connections and to 0 if the total --

Signed and Sealed this

Fifteenth Day of January, 2008

JON W. DUDAS
*Director of the United States Patent and Trademark Office*